US012759845B2

(12) United States Patent
Duerrer et al.

(10) Patent No.: US 12,759,845 B2
(45) Date of Patent: Oct. 13, 2026

(54) HANDRAIL FOR A PASSENGER TRANSPORT SYSTEM

(71) Applicant: Semperit AG Holding, Vienna (AT)

(72) Inventors: Albrecht Duerrer, Bad Vöslau (AT); Bernhard Wunsch, Vienna (AT); Reza Beglari, Vienna (AT)

(73) Assignee: Semperit AG Holding, Wein (AT)

( * ) Notice: Subject to any disclaimer, the term of this patent is extended or adjusted under 35 U.S.C. 154(b) by 115 days.

(21) Appl. No.: 18/255,250

(22) PCT Filed: Dec. 7, 2021

(86) PCT No.: PCT/EP2021/084594
§ 371 (c)(1),
(2) Date: May 31, 2023

(87) PCT Pub. No.: WO2022/122731
PCT Pub. Date: Jun. 16, 2022

(65) Prior Publication Data

US 2024/0092613 A1 Mar. 21, 2024

(30) Foreign Application Priority Data

Dec. 8, 2020 (DE) ..................... 10 2020 132 647.5

(51) Int. Cl.
*B66B 25/00* (2006.01)
*B66B 23/24* (2006.01)

(52) U.S. Cl.
CPC ............ *B66B 25/006* (2013.01); *B66B 23/24* (2013.01)

(58) Field of Classification Search
None
See application file for complete search history.

(56) References Cited

U.S. PATENT DOCUMENTS 6,047,814 A 4/2000 Alles et al.
6,112,166 A * 8/2000 Joosten .................. B66B 27/00 702/185

(Continued)

FOREIGN PATENT DOCUMENTS

CN 1639051 A 7/2005
CN 205675972 U 11/2016

(Continued)

OTHER PUBLICATIONS

European Patent Office; International Search Report; Mar. 4, 2022; entire document.

(Continued)

*Primary Examiner* — Kavel Singh
(74) *Attorney, Agent, or Firm* — Price Heneveld LLP

(57) ABSTRACT

A handrail for a passenger transport system, such as an escalator or a moving walkway, wherein at least one transponder containing at least one piece of information is integrally arranged on the surface or inside the handrail, wherein the transponder is configured such that the at least one piece of information can be transmitted contactlessly from the transponder to a reader, wherein the handrail includes several layers, wherein one of the layers includes a fabric structure, and wherein the transponder is integrated into the fabric structure or rests against or on the fabric structure.

16 Claims, 3 Drawing Sheets

(56) References Cited

U.S. PATENT DOCUMENTS

| | | | | |
|---|---|---|---|---|
| 6,673,431 | B1 * | 1/2004 | Ledzinski | B66B 23/24 428/292.1 |
| 9,994,429 | B1 * | 6/2018 | Taniguchi | B66B 25/006 |
| 10,954,105 | B1 * | 3/2021 | Pahlke | B66B 27/00 |
| 11,034,551 | B2 * | 6/2021 | Pahlke | B66B 21/04 |
| 2015/0009015 | A1 | 1/2015 | Nakata et al. | |

FOREIGN PATENT DOCUMENTS

| | | | | |
|---|---|---|---|---|
| DE | 4444263 | C1 | 5/1996 | |
| DE | 19643997 | C2 | 12/2002 | |
| DE | 10297765 | B4 | 7/2013 | |
| EP | 2824631 | B1 | 9/2019 | |
| EP | 3628634 | A1 | 4/2020 | |
| JP | 2005194055 | A | 7/2005 | |
| JP | 2009173364 | A | 8/2009 | |
| WO | 2004014774 | A1 | 2/2004 | |
| WO | WO-2006029706 | A1 * | 3/2006 | B66B 23/24 |
| WO | 2009155143 | A1 | 12/2009 | |

OTHER PUBLICATIONS

Wikipedia; transponder; May 11, 2020; https://de.wikipedia.org/w/index.php?title=Transponder&oldid=199829686.

Wikipeidia; RFID; Nov. 26, 2020; https://de.wikipedia.org/w/index.php?title=RFID&oldid=205943551.

* cited by examiner

HANDRAIL FOR A PASSENGER TRANSPORT SYSTEM

BACKGROUND

The present invention relates to a handrail for a passenger transport system, a system comprising a passenger transport system having a handrail and a data processing device, and a method for monitoring a passenger transport system having a handrail.

Handrails for passenger transport systems are known from the prior art. For example, a handrail can be moved around on a guide rail attached to the top of a railing and serves as a support for people to hold on to. To ensure precise and reliable identification of handrails, handrails are often equipped with identification marks, for example code numbers, type designations, serial numbers and/or bar/QR codes. These identification marks are printed or embossed on the handrail, for example. The identification signs are produced, for example, by means of an embossing plate, for example made of metal, which comprises, for example, numbers and/or letters, or a combination thereof. For production, the embossing plate can be placed in a production mold during vulcanization. If the embossing plate is removed afterwards, the identification mark is visible on the handrail. It is important that this identification mark is easily accessible and readable at all times, especially over the entire service life of the handrail. Good long-term accessibility and readability are important, for example, for maintenance work and, if necessary, efficient procurement of replacements.

The disadvantage of such identification marks is that they can wear out over time or become illegible due to soiling. In addition, it can happen that the identification mark is applied incorrectly or not at all during production. In such cases, obtaining replacements becomes much more difficult because information about the manufacturer, the specific type of handrail and its properties, such as its length, can often only be easily determined by means of the identification mark.

It is therefore the object of the invention to provide a handrail that has an identification option that can be read as reliably as possible over its entire service life.

SUMMARY

According to one aspect of the invention, a handrail for a passenger transport system, such as an escalator or a moving walkway, is provided, wherein at least one transponder containing at least one item of information is arranged integrally on the surface or in the interior of the handrail, wherein the transponder is designed such that the at least one item of information can be transmitted or is transmissible from the transponder to a reader in a contactless manner. Preferably, the handrail can be designed to be movable circumferentially on a guide rail of the passenger transport system. Advantageously, the handrail can be made of a flexible material. A flexible material can enable or facilitate circulation of the handrail on the guide rail. The handrail may have a C-shaped cross-section. Preferably, it may be provided that the legs of the C-shaped cross-section enclose the guide rail of the passenger transport system, while the back of the C-shaped cross-section is arranged on the side facing away from the guide rail. In this case, in particular, the C-shaped cross-section of the handrail may be oriented to at least partially enclose the guide rail with its inner portion, in particular an upper side and the lateral portions of the guide rail. The cross-section of the handrail, in particular perpendicular to the longitudinal direction of the handrail and/or to a longitudinal direction of a corresponding guide rail of the passenger transport system, may be constant and/or have a constant thickness. The handrail may comprise a central portion, for example corresponding to the back of the C-shaped cross-section, and two lateral lips designed to embrace the guide rail of the passenger transport system. In particular, the lateral lips may be configured to engage a guide groove or guide rail of the guide rail. Preferably, the handrail may have at least such rigidity in a direction transverse to the guide rail that it cannot be pulled down from the guide rail. The handrail may comprise an outer material, for example a rubber material and/or or polyurethane, in particular a thermoplastic elastomer material. Alternatively or additionally, the C-shaped cross-section described above may be designed to prevent the handrail from sliding off the guide rail. Preferably, the handrail is designed such that, when guided by the guide rail in use, it does not exceed a maximum distance from the guide rail of 8 mm. A sufficiently small distance reduces the risk of persons holding on to the handrail trapping themselves or, for example, their fingers. The handrail may be designed to move circumferentially on a guide rail attached to the top of a railing and/or to serve as a support for persons to hold on to. In the context of the present invention, an upper side of the handrail is to be understood as the side of the handrail that faces away from the railing during operation. A longitudinal direction, in the sense of the invention, corresponds to the direction in which the handrail is moved during operation and/or in which the handrail has its greatest extension. A transverse direction runs perpendicular to the longitudinal direction in the sense of the invention. In particular, the transverse direction may correspond to the extension of the width of the handrail when viewed from above the railing on which the handrail is mounted in use. Preferably, the handrail is configured such that it is stable, regardless of environmental conditions and repeated use, both in terms of tensile performance, crack resistance and also its dimensions. A contactless transmission may mean, in particular, that signals are transmitted by means of electromagnetic waves. The transponder may comprise an antenna. Preferably, the antenna is adapted to its environment, i.e. in particular to its placement in the handrail and possibly to its placement in the passenger transport system. In this way, possible interference from the environment, in particular from metallic components in the environment, can be excluded or prevented, if necessary. The antenna can be pulled through two holes in the transponder and/or protrude laterally or obliquely from the transponder. The antenna may be formed as a wire loop with at least one loop. The wire loop may be substantially round or angular, in particular rectangular. The transponder may further comprise a circuit, in particular an analog circuit, for receiving and transmitting signals. Preferably, the transponder may comprise a digital circuit and a data memory. Advantageously, the data memory may store the at least one piece of information. The digital circuit may be adapted to process data and/or control the reading and/or writing of data to and/or from the data memory. The digital circuit may optionally be a microcontroller. The transponder may, for example, comprise a permanent, i.e. write-once, data memory. In this case, it is conceivable that the transponder can only be read out, while no further data can be written to the transponder, in particular during operation. Alternatively, the data memory may be rewritable. A rewritable data memory may allow data to be written to the data memory during operation of the transponder or the handrail. For example, the transponder may be a passive transponder. The passive transponder may be configured to be powered by means of an alternating field generated by the reader or radio waves generated by the reader. Advantageously, the passive transponder does not require its own energy supply or energy storage. For example, a capacitor can be charged by means of induction via a coil. Alternatively or additionally, the transponder can also have its own energy storage and/or power supply. For example, the transponder may be a semi-active transponder in that it is configured, for example, to independently power only the digital circuitry, while the circuitry for receiving and/or transmitting is merely passive, relying in particular on a power supply from electromagnetic fields or waves from the reader. The transponder may be an active transponder in which both circuits are independently powered. For example, the transponder may be configured to decode a command sent by the reader. For example, the transponder may be configured to modify the field generated by the reader in response to a transmitted command, for example by load modulating the signal, i.e., e.g., inductive coupling, and/or modulating backscatter, i.e., e.g., reflecting the received signal in antiphase. The modification of the field can preferably be detected and interpreted by the reader. It is also conceivable, for example, that the transponder creates its own signal which the reader can receive. Preferably, the at least one piece of information may be suitable for identifying the transponder and/or the handrail. The at least one piece of information may comprise an identification means, in particular an identifier, for identifying the transponder and/or the handrail. In particular, the at least one piece of information may comprise an identification number and/or serial number, preferably unique and/or uniquely assignable to the handrail. Preferably, the transponder may be adapted to encrypt the information. The expression “at least” one transponder means that, in one possible variant, the handrail comprises exactly one transponder. Alternatively, however, several transponders may be integrated on and/or in the handrail. The transponders may be arranged close to each other or may be arranged at a greater distance from each other, for example at a regular distance from each other. The handrail according to the invention can have the advantage that the handrail can be reliably identified over its entire service life, and in particular that information can be reliably extracted, provided and read. Furthermore, with a handrail according to the invention, it is an option to identify or verify original components or an original handrail more easily. In addition, digitization results in the possibility of an improved, in particular simplified and faster, exchange of information between manufacturer and user. In addition, there are optionally further possibilities, such as personalization of products and services, tracking and monitoring of components of the passenger transport system, in particular of the handrail during the entire service life or lifetime, recording and/or processing and analysis of operational and/or environmental data and/or monitoring of the condition of components or the handrail. The reader may optionally be an end-user device, in particular a smartphone, tablet or laptop.

Preferably, the transponder can be an RFID tag or an NFC tag. For example, the NCF tag can operate at a frequency of 13.56 MHz. For example, the RFID tag may operate in a frequency range between 860 and 960 MHz. The RFID tag may also operate in the longwave, mediumwave, or shortwave bands. RFID tags and NFC tags have the advantage that they can be manufactured relatively cheaply and require little space, for example only a few centimeters, in particular e.g., 1-3 cm). An NCF tag, in particular, can also offer the possibility of secure transmission, as it is often quite short-range and therefore less likely to be intercepted by other sources. NFC tags can also provide good two-way communication between the tag and the reader. Advantageously, an NFC tag may be directly readable by an end-user device, in particular a smartphone and/or a tablet. RFID tags, on the other hand, offer the possibility of relatively long-range communication, for example.

The transponder, in particular the RFID tag or the NFC tag, can be designed as a wire coil, foil, printed circuit board (PCB). The embodiment in which the transponder is designed as a PCB is particularly advantageous. Dynamic and static tests have shown that the PCB can be particularly resistant to damage caused by stresses resulting from use and/or manufacture of the handrail. In particular, the PCB may be more resistant than other embodiments, especially than the above-mentioned alternative embodiments, to occurring vulcanization temperatures (e.g., up to 180° C.) and/or extrusion temperatures (e.g., up to 220° C.) and/or to pressures occurring during operation (e.g., up to 30 bar during vulcanization or extrusion). During operation of a handrail for passenger transport systems, in particular escalators, the handrail is subject to a high number of alternating bends and acting normal forces, which act in particular on the sliding layer or a sliding layer and/or on the cover layer or a cover layer. For example, over 5 million alternating bends may occur during the lifetime of a handrail. It has been shown that conventional transponders according to the prior art can already break after significantly fewer bending cycles due to the normal forces acting as a result of the bending cycles and also the pressures occurring during production. In the case of prior art transponders, a significantly lower life expectancy was found here. For example, a wire-based NFC-Tag was destroyed after 2 hours on an alternating bending test rig and after about 400 alternating bends, while a PCB transponder was still essentially undamaged. Alternating bend test stands from Kone and from Schindler were used. Here it was found that a tested PCB could withstand both the vulcanization temperatures or extrusion temperatures and the compression pressures essentially undamaged. Additionally or alternatively, the transponder may be rigid or flexible. Particularly preferably, the transponder, especially the PCB, is rigidly designed. A rigid design of the transponder, in particular in the form of a rigid PCB, has proven to be particularly resistant to the stresses occurring during manufacture and operation.

Preferably, the transponder can comprise a dipole antenna. For example, a dipole antenna can enable signal transmission over relatively long ranges, for example over several meters, for example 1 m-5 m, or even up to about 100 m. The dipole antenna may be linear, folded, or spiral, for example. Preferably, a circuit or chip of the transponder may be centrally located between two antenna arms. A dipole antenna can ensure relatively good signal strength, but ideally requires little space. Alternatively or additionally, it is also conceivable for the transponder to have an induction coil as an antenna, for example.

In a preferred embodiment, the handrail comprises a cover layer or a base body. In particular, the base body can be a rubber layer made of a rubber material, of rubber and/or of polyurethane, wherein the base body is preferably arranged on an outer side of the handrail facing away from the guide rail. However, the base body can in particular also enclose the complete outwardly exposed area or the complete outer area of the handrail. For example, the handrail may have a C-shaped cross-section and the base body encloses and/or covers the outer region of the C-shaped cross-section, while the inner region of the C-shaped cross-section is not covered by the base body. Advantageously, the base body may be exposed to the outside for contact with hands of users of the passenger transport system. Preferably, the handrail may comprise other layers in addition to the base body. For example, the handrail may comprise a sliding layer and/or a reinforcing member and/or an elongation inhibitor and/or one or more inner layers, e.g. of rubber and/or thermoplastic elastomers and/or of fabric or a fabric structure.

Preferably, the handrail can have a sliding layer, which in particular has good sliding properties, wherein the sliding layer is designed to face a guide rail of the passenger transport system. For example, the sliding layer can be made of a fabric, a textile or a plastic.

According to one embodiment, the handrail may consist of several layers, wherein one of the layers is an inner layer, wherein the transponder is integrated into the inner layer or resting against, in particular on, the inner layer. The inner layer may in particular be a fabric structure. The fabric structure can serve as a strength member for the handrail. Alternatively, it is also conceivable that the transponder is integrated into an outer layer. “Integrated into the fabric structure” can mean in particular that the fabric structure has a hole, a cavity or a depression, the size of which is in particular just sufficient to accommodate the transponder therein. The transponder may be enclosed by the fabric structure or may not be covered by the fabric structure to one side. In particular, abutment against the fabric structure may mean that the transponder is in contact with the fabric structure or, is pressed fully or partially into it. Preferably, the fabric structure may include a recess on a side adapted to face away from a guide rail of the passenger transport system in use. For example, the fabric structure may have a recess on a side corresponding to the back of a C-shaped cross-section of the handrail. Other layers may include, for example, the base body described above and/or the sliding layer described above. For example, the base body may be the outermost layer of the handrail and/or may be disposed on an outer side of the handrail facing away from a guide rail of a passenger transport system. Directly below and/or adjacent to the base body may be the fabric structure in which the transponder is integrated. The sliding layer can be located on an outer side facing the guide rail. In the case of a C-shaped cross-section of the handrail, for example, the base body may be arranged on the outer side of the C-shaped cross-section, the sliding layer may be arranged on the inside of the C-shaped cross-section, and the fabric structure may be arranged in the region between these two outer layers. Preferably, the recess of the fabric structure may be on a side of the fabric structure facing the base body.

Preferably, the handrail can have a longitudinally extending reinforcement part or an elongation inhibitor, which consists, for example, of one or more metal strips, in particular steel strips, metal cables, in particular steel cables, and/or plastic cords, in particular reinforced with aramid and/or carbon fiber. Additionally, or alternatively, the reinforcing member may be configured as a steel cord. Preferably, the metal cord may be arranged in the central portion of the handrail with a flat side substantially parallel to the central portion. In a use condition, the flat side of the metal band may be arranged parallel to the ground surface, particularly when a respective section of the handrail is oriented parallel to the ground surface. The reinforcing member toward the top side and toward the bottom side opposite to the top side may be surrounded by the fabric structure. The transponder can be integrated in the fabric structure arranged towards the upper side.

Advantageously, the transponder can be arranged close to and/or on a neutral axis of the handrail. The neutral axis is in particular an axis about which the handrail is alternately bent. The neutral axis can essentially correspond to the position of the reinforcement part. “Close to the neutral axis” may mean that the transponder is arranged closer to the neutral axis and/or the reinforcement part than to an outer side of the handrail, at least in a direction parallel to the flat side of the reinforcement part. The transponder may be arranged between the reinforcement part and a top surface of the handrail, wherein the transponder is preferably arranged closer to the reinforcement part than to the top surface. An upper side of the handrail in this case is in particular the side of the handrail that faces away from the railing during operation. Alternatively, the transponder may be arranged in the same plane as the reinforcement part. An arrangement close to the reinforcement part can advantageously counteract damage to the transponder during operation, in particular due to alternating bends.

Advantageously, the transponder, in particular the PCB, can be encased by an adhesive material and/or provided with an adhesion promoter. The adhesive material can preferably be designed in such a way that it adheres to the layers surrounding the transponder, in particular the fabric structure and/or the reinforcement part. Particularly in the case of a rigid transponder, especially a PCB, adhesion can ensure that an operating sequence of the handrail is not or not significantly negatively influenced by the transponder and/or that the transponder slips into an unfavorable position. In addition, this may also prevent the transponder from causing various layers of the handrail to unravel.

Advantageously, the transponder can have a section of signal-optimizing and/or attenuating material, wherein the section is arranged in particular adjacent to the transponder and/or attached to the transponder. The section of signal-optimizing and/or attenuating material may in particular be arranged on a side of the transponder facing the reinforcement part. In other words, the section may be arranged between the transponder and the reinforcement part. The signal-optimizing material can, for example, be designed to shield the transponder from the reinforcement part and/or to reflect signals coming from the direction of the transponder towards the reinforcement part. Advantageously, an influence of the reinforcement part on the transponder signal or the range of the transponder signal can be reduced. As a result, a signal range of the transponder, at least towards an upper side of the handrail, can advantageously be improved. The signal-optimizing and/or attenuating material can be, for example, a metal foil. The metal foil can be designed as the back of the transponder.

The transponder can preferably be round or square. The transponder is particularly preferably round. With a round transponder, it is particularly easy to prevent positional separation from the layers surrounding the transponder during operation.

According to one embodiment, the extension of the transponder in the transverse direction and/or a diameter of the transponder is smaller than an extension of the reinforcement part in the transverse direction. In particular, this can prevent adjacent layers of the handrail from being cut open by the transponder. The extension of the transponder in the transverse direction and/or an extension of the diameter of the transponder in the transverse direction can be in a ratio of 0.01 to 0.8, preferably 0.02 to 0.5 and particularly preferably 0.05 to 0.20, to the extension of the handrail in the transverse direction or to a width of the handrail. In particular, an outer width of the handrail is assumed to be the width of the handrail. With a ratio of 0.01 to 0.8, advantageously, unraveling of adjacent layers can be particularly effectively prevented. With a ratio of 0.02 to 0.5, the transponder can be embedded particularly well in the handrail, especially in a fabric structure. A ratio of 0.05 to 0.20 has also been found to be particularly favorable for enabling a range of the transponder that is favorable in practice. Alternatively, or additionally, it has been shown that an extension in the transverse direction or a diameter of the transponder is quite preferably in a range from 0.6 mm to 12 mm. With such a diameter, on the one hand, the transponder can be particularly well protected against damage due to bending and, on the other hand, it can be prevented that layers surrounding the transponder are unraveled. In addition, it has been shown that signal ranges greater than the thickness of the layers overlying the transponder can be achieved particularly reliably. Optionally, the transponder, in particular in an embodiment as an RFID tag, can comprise a flexible antenna which has a greater extension in the longitudinal direction and/or transverse direction than the size ratios specified here. Advantageously, a flexible antenna may be designed to be harmless to the surrounding layers and/or may itself be substantially insensitive to bending. Additionally, or alternatively, the transponder may advantageously have a thickness which is less than 2 mm. Preferably, the thickness may be in a range of 0.6 mm to 1.2 mm. The thickness of the transponder can be in a ratio to a thickness of the handrail of 0.01 to 0.4 preferably, 0.02 to 0.3, particularly preferably 0.05 to 0.2. In particular, a thickness is measured in a direction substantially perpendicular to the longitudinal direction and perpendicular to the transverse direction. Additionally, or alternatively, the thickness of the transponder may be less than or equal to the thickness of the layer surrounding the transponder. In particular, the layer surrounding the transponder may be the fabric structure as described herein. These ratios may allow the layers surrounding the transponder to fully absorb normal forces that occur.

Advantageously, the transponder can be arranged in such a way that a side of the transponder facing an outer side, in particular the upper side, of the handrail is spaced further away from the outer side, in particular the upper side, or the same distance away than a side of the fabric structure in which the transponder is embedded facing the outer side, in particular the upper side, of the handrail. Particularly preferably, the side of the transponder facing the outer side, in particular the upper side, of the handrail is spaced further from the outer side, in particular the upper side, than the side of the fabric structure in which the transponder is embedded facing the outer side, in particular the upper side, of the handrail. In other words, the transponder may be offset from the fabric structure in a direction transverse to the longitudinal direction and transverse to the transverse direction with respect to its side facing away from the reinforcement part. Such an embodiment enables the layer surrounding the transponder to absorb the high normal forces over its entire surface in operation, and the possibility of layer separation at the transition from the transponder to at least one layer adjacent to the transponder can be significantly reduced. This could be verified in particular on the basis of dynamic product tests on alternating bending test rigs. During these tests and/or during operation, surface pressures of e.g. up to $1500 N/cm^2$ can occur. An alignment towards the top side can simplify the readout of the data and/or reduce the signal range requirements.

Advantageously, the transponder can be ring-shaped. A ring-shaped design can result in better material penetration, better adhesion to the layers surrounding the transponder and/or better dynamic resistance of the transponder and/or the material of the handrail. For example, the transponder can be designed as a ring-shaped PCB or as a foil-based ring-shaped NFC tag.

Advantageously, the handrail can have a marking on its upper side above the transponder embedded in the handrail. The marking can be, for example, an inscription, a geometric shape and/or a symbol. The marking can, for example, be printed on the handrail, stamped on, and/or embossed. Advantageously, the marking can facilitate identification of the position of the transponder.

According to one embodiment, multiple transponders, for example two or three, may be arranged on the surface and/or inside the handrail. For example, a first transponder may be arranged on the surface of the handrail and a second transponder may be arranged inside the handrail. For example, it is conceivable that one or more RFID tags and simultaneously one or more NFC tags are integrated in the handrail and/or are arranged on the surface of the handrail. Advantageously, several transponders can be configured, for example, for different functions, such as, on the one hand, reading/capturing and, if necessary, forwarding data and, on the other hand, outputting stored information. The transponders can be arranged at different positions in and/or on the handrail, in particular with regular distances between them. Several transponders can have the same function. For example, the transponders can have only a short range and several transponders can be arranged at different positions, in particular evenly distributed. By arranging them at different locations, it may be possible in this case, for example, for one or more readers to read information from a transponder and/or send commands to the transponder from different locations, in particular from any position that is sufficiently close to the handrail, for example 1-5 meters, preferably 1-2 meters, from the handrail.

Advantageously, the handrail can comprise a data memory. In particular, the transponder can comprise a data memory or be connected to a data memory. Preferably, the transponder may be configured to receive data and/or commands and store them on the data memory. In particular, the transponder may be configured to transmit data from the transponder to a reader in a contactless manner. For example, the transponder and/or the data memory may be configured to store operational data of the handrail, environmental conditions of the handrail, information about the passenger transport system, or information about components of the escalator. Operational data and/or information may include, for example, a temperature, in particular of the handrail, a load, forces, pulses, and/or torques, in particular on the handrail or on other components of the passenger transport system, light of different wavelengths falling on the handrail during operation, for example, humidity and/or air humidity in the environment or on a component of the passenger transport system, a UV index, a presence and/or concentration of $O_3$, CO, $CO_2$ and/or other gases, a solar radiation, electromagnetic fields, a presence and/or concentration of bacteria, vibrations, noise, an electrical load, a (for example electrical) resistance, GPS position data, and/or trigger events. Preferably, the transponder may be designed to allow data to be transmitted from the transponder to a reader without contact. Alternatively or additionally, the transponder may be adapted to receive commands that may be directed, for example, to control the operation of the transponder. In other words, the transponder may comprise a write function. For example, the transponder may be configured to allow a data processing device or a usercontrolled device to write data or commands to the transponder. Advantageously, the data memory may be integrated on the surface or inside the handrail. Preferably, if the data memory is not part of the transponder, the data memory may be integrated into the handrail in proximity to the transponder, such as adjacent to the transponder. For example, a recess in a fabric structure of the handrail in which the transponder is embedded may be wide and/or deep enough for the data memory to also be placed therein. Preferably, the data memory is connected to the transponder and arranged in a recess in the fabric structure together with the transponder. Advantageously, the data memory may be a non-volatile data memory. For example, with a non-volatile data memory, data is not lost even when no power is present.

Advantageously, the transponder may comprise or be connected to a processing unit adapted to process the received data. In particular, the transponder may be configured to allow the processed data to be transmitted contactlessly from the transponder to a reader, wherein the transponder is configured to allow the processed data to be transmitted contactlessly from the transponder to a reader. For example, the processing unit may be configured to output a prediction of a behavior, for example, of components of the passenger transport system, in particular the handrail, based on operational data and/or environmental data and/or stored, in particular time and/or environment-dependent, empirical values. For example, the processing unit can determine an expected service life of the handrail, the handrail material, or other components of the passenger transport system. Alternatively, an expected service life of the handrail, the handrail material, or other components of the passenger transport system can also be stored on the transponder purely time dependent, in particular depending on an age of the handrail.

Advantageously, a URL that refers to an assigned interface can be stored on the transponder. In particular, the transponder can be designed so that the URL can be transmitted contactlessly from the transponder to a reader. For example, the at least one piece of information may include the URL pointing to an associated interface. For example, the interface may be and/or include a customer interface. The transponder may be configured such that, by means of the URL, when the at least one piece of information is retrieved on the reader, in particular on a tablet and/or smartphone, the transponder causes and/or suggests to the user that the interface, in particular the customer interface, be called. For example, the interface may be designed to visualize and/or analyze operational data. A customized visualization and/or voice output of a web or application interface of operational data and/or product information is conceivable. The interface may be configured to allow visualization and/or analysis of operational data and/or product information via the interface in real time and/or based on previously recorded data. For example, the URL may be stored on an NFC tag. In other words, the transponder may be an NFC tag and/or comprise an NFC tag described with the URL.

According to one embodiment, the transponder may include a sensor or be connected to a sensor. For example, the handrail can comprise at least one sensor and/or at least one transducer with an evaluation unit, wherein the sensor and/or the transducer, in particular analog or digital, is integrated in the transponder or is connected to the transponder. For example, the transponder can be connected to the sensor or transducer without contact or by cable. The sensor or transducer may be attached to or integrated into the handrail. For example, the sensor or transducer may be integrated into the handrail adjacent to the transponder. Alternatively, the sensor or transducer may be integrated into the handrail at a distance from the transponder. If the sensor has a certain distance from the transponder, this can have the advantage, for example, that interference or interfering signals between the transponder and the sensor are reduced or avoided. Alternatively, the sensor can also be arranged externally or outside the handrail. For example, the sensor may be attached to a railing of the passenger transport system. It is conceivable that transponder and sensor are arranged in such a way that the transponder with the handrail cyclically passes the sensor during operation, and data can be exchanged between the sensor and the transponder in each case when the transponder is within a transmission range of the sensor during the circulation. Advantageously, the sensor is adapted to record a measurand. The sensor may be oriented to record the measurand in a timed manner, for example based on trigger events and/or according to a fixed schedule. Alternatively or additionally, the sensor may be oriented to record the measurand continuously or at regular intervals. Advantageously, the transponder can be designed to store measured variables recorded by the sensor as data and/or to transmit them without contact.

Advantageously, the transponder can be designed to be supplied with energy via potential, kinetic and/or radiant energy, in particular by means of energy harvesting. According to one embodiment, the transponder can be designed to be supplied with energy by an electromagnetic field, in particular an alternating field or radio waves generated by the reader, and/or by an integrated or connected energy storage device and/or by power generation components integrated in the handrail. For example, the transponder may be energizable by means of light and/or by means of heat and/or by means of electrostatic charging and/or by means of the piezoelectric effect. Energy sources for the transponder can be, in particular, a fluid or fluid flow, a temperature difference or temperature gradient, in particular of the ambient temperature, a height difference, gravity or gravitation, a self-charging generated by movement, vibration and/or unrest, in particular corresponding to the self-winding of a wristwatch, and/or friction, for example by movement of the handrail. For example, the transponder may be a semi-active transponder in that it is configured, for example, to independently power only the digital circuitry, while the circuitry for receiving and/or transmitting is merely passive, relying in particular on a power supply from electromagnetic fields or waves from the reader and/or the components integrated into the handrail for power generation.

A further aspect of the invention is a system for monitoring a passenger transport system, in particular a handrail of a passenger transport system, comprising a passenger transport system such as an escalator or a moving walkway, with a handrail, in particular with a handrail as described in this paper, wherein a transponder is arranged integrated on the surface or inside the handrail, which transponder contains at least one piece of information, wherein the transponder is designed such that the at least one piece of information is or can be transmitted contactlessly from the transponder to a reader. Furthermore, the system comprises a data processing device comprising a or the reader, wherein the data processing device is designed to read out the at least one piece of information of the transponder and/or data stored on the transponder by means of the reader in a contactless manner and to be able to evaluate and/or forward it. All advantages and features described for the handrail can be transferred analogously to the system and vice versa. Preferably, the handrail can be designed to be movable circumferentially on a guide rail of the passenger transport system. The guide rail may be attached to, preferably on top of, a railing of the passenger transport system. For example, the guide rail may have a substantially U-shaped, W-shaped or T-shaped shape, preferably with a transverse strut located at the top. Preferably, the guide rail can have a guide groove or guide rail laterally and/or below the cross strut by means of which the handrail can be guided, in particular by means of lateral lips of a C-shaped cross-sectional profile of the handrail. The guide rail may be made, for example, of metal, for example steel or aluminum, and/or of plastic. In particular, a return and/or a drive for the handrail can/may be arranged in the handrail, under the handrail and/or next to the handrail. Preferably, the passenger transport system may be configured such that the handrail moves synchronously with the passenger transport system, in particular with circulating segments of the passenger transport system or passengers transported by the passenger transport system, or slightly faster, in particular no more than 2% faster. The passenger transport system may comprise, for example, a control system adapted to monitor and/or control the operation of the passenger transport system. The data processing device may be a mobile device or a stationary device. In particular, the data processing device may be attached or attachable to the passenger transport system, such as to a railing of the passenger transport system. For example, the data processing device may be attached at a location that is proximate to the handrail. If the data processing device is mounted close to the handrail, then in the case of a circulating handrail, the transponder of the handrail can cyclically return to the vicinity of the data processing device during operation. This can have the advantage that a contactless signal only needs to be transported over a short distance, requiring less power and reducing the likelihood of interference with other signals. A mobile data processing device has the advantage that it can be used for multiple systems, for example, and in particular can also reconcile data from multiple systems without requiring an additional switching station or an additional central data link. The data processing device may optionally have a user interface or be connected or connectable to a device having a user interface. Advantageously, the data processing device comprises a reader that can be used in particular to request and/or read data from the transponder. Preferably, the data processing device may also comprise a transmitter adapted to be able to send data to the transponder. The reader may be a readout device and/or an evaluation device. The readout device and/or evaluation device may comprise a processing unit, a memory unit and/or a network and/or internet connection. Alternatively or additionally, the reader device may be an end-user device, in particular a smartphone, tablet or laptop.

Advantageously, the data processing device may be designed to classify users and/or components, in particular components of the passenger transport system, including, for example, the handrail. For example, the data processing device may be adapted to recognize original components. Expediently, the data processing device may have a component database, for example in a data memory of the data processing device or have access to a component database, for example via a data network and/or via the Internet. For example, the data processing device may be configured to match components against the database, in particular via an identification number, and recognize them as listed or unlisted. Advantageously, the data processing device may be configured to send information about detected components to a control system, in particular the passenger transport system, or to a user interface. Additionally or alternatively, the data processing device may be adapted to initiate a warning and/or a notification and/or a blocking of the passenger transport system, for example via the user interface and/or the control system and/or a data network.

Expediently, the data processing device can be designed to communicate with other devices and/or appliances, e.g. with a control system of the passenger transport system or with mobile devices such as smartphones. Advantageously, the data processing device may be designed to communicate via GSM, LTE, UMTS and their further developments, Bluetooth, LAN, WLAN, and/or BUS connections.

Advantageously, the data processing device may comprise or be connected to a data memory, wherein the data processing device may be adapted to store the at least one piece of information and/or data from the transponder on the data memory. The data processing device may be connected to an external computing unit, wherein the data memory may be part of the computing unit. Alternatively or additionally, the data processing device may be connected to a cloud service, wherein the data processing device may be adapted to store data on the cloud service and/or retrieve data from the cloud service.

Advantageously, the system can comprise at least one sensor device which is designed to detect data, in particular operational data and/or environmental data, and to forward them to the transponder and/or the data processing device, wherein the data processing device can be designed to receive and process and/or store and/or forward the data of the sensor device. For example, the sensor device may be adapted to detect operational data of the handrail and/or the passenger transport system, environmental conditions of the handrail and/or the passenger transport system, information about the passenger transport system or about components of the passenger transport system. For example, the sensor device may be oriented to sense physical measurands and/or parameters. Examples of measurands and/or parameters include a temperature, in particular of the handrail, a load, forces, pulses, and/or torques, in particular on the handrail or on other components of the passenger transport system, light of different wavelengths falling on the handrail during operation, for example, humidity and/or air humidity in the environment or on a component of the passenger transport system, a UV index, a presence and/or concentration of $O_3$, CO, $CO_2$ and/or other gases, solar radiation, electromagnetic fields, a presence and/or concentration of bacteria, vibration, noise, an electrical load, a (for example electrical) resistor, GPS position data, and/or trigger events. For example, the data may be storable on the data memory of the data processing device.

Advantageously, the data processing device can be configured to predict or calculate a behavior and/or an expected service life of components of the passenger transport system, in particular the handrail and/or the handrail material. For example, the data processing device may be configured to predict future behavior by analyzing the components, for example using sensor data, or operational data and comparing it to empirical values and/or production data. The data processing device may be configured to perform an action based on such a prediction. For example, the data processing device may be configured to initiate an automatic notification to a user and/or an authorized organization regarding detected errors and/or problems and/or necessary action steps. For example, the data processing device may output a recommended action based on a database. It is also conceivable that the data processing device issues an automatic notification regarding upcoming maintenance work and/or tests, in particular depending on a usage time of the components and/or on, in particular measured, operational data.

Advantageously, a URL can be stored on the data processing device and/or on the transponder that refers to an assigned interface. It is conceivable that the interface comprises a customized visualization and/or voice output of a web or application interface of operational data and/or product information. The interface may be configured such that visualization and/or analysis of operational data and/or product information may be performed via the interface in real time and/or based on previously recorded data. The interface and/or data processing device may be configured to provide access to and or download various information. The various information may include handrail production data, material information, production process information, drawings, brochures, advertisements, spare parts information, ordering and delivery information, production status information, billing information, specifications, installation and maintenance information, replacement or replacement information, service life information, next maintenance date information, passenger transport system information, GPS location, manufacturer contact information, contract information, material safety data sheets, disposal guidelines, company information, alternative product information, passenger transport system uptime and speed, unit availability and utilization, supplier contact information for spare parts and/or maintenance. In particular, the interface and/or data processing device may be configured to visualize the information, particularly information from the examples above.

Advantageously, the data processing device may be designed to classify users and/or components, in particular components of the passenger transport system, including, for example, the handrail. For example, the data processing device may be designed to recognize original components. Expediently, the data processing device may have a component database, for example, in a data memory of the data processing device or have access to a component database, for example, via a data network and/or via the Internet. For example, the data processing device may have a handrail database stored thereon, or the data processing device may be configured to be able to connect to a handrail database, wherein the data processing device may be configured to detect whether a handrail is an original handrail by matching the at least one piece of information with the database. The at least one piece of information may be information about the identity of the handrail. The data processing device may be configured to detect whether a handrail is an original handrail by matching the at least one piece of information about the identity of the handrail with the database. For example, the data processing device may be configured to match components with the database, in particular via an identification number, and to recognize them as listed or unlisted.

Advantageously, the data processing device may be designed to perform or initiate a predetermined action, in particular issuing a message and/or a command to prevent operation of the passenger transport system, upon detection of a non-original component, such as a non-original handrail. For example, the data processing device may be adapted to send information about detected components to a control system, in particular a control system of the passenger transport system, or to a user interface. Additionally or alternatively, the data processing device may be adapted to initiate a warning and/or a notification and/or a blocking of the passenger transport system, for example via the user interface and/or the control system and/or a data network.

Another aspect of the invention is a method for monitoring a passenger transport system, such as an escalator or a moving walkway, having a handrail, in particular a handrail as described in this paper, wherein a transponder is arranged integrated on the surface or inside the handrail, which transponder contains at least one piece of information, wherein the transponder is designed such that the at least one piece of information can be or is transmitted contactlessly from the transponder to a reader. The method comprises the following steps:

- contactlessly transmitting at least one piece of information of the identity of the handrail and/or operational data and/or environmental data from the transponder to a data processing device by means of a reader of the data processing device; and
- evaluation and/or forwarding of the at least one piece of information and/or the operational data by the data processing device. All advantages and features described for the handrail and/or the system can be transferred analogously to the method and vice versa.

According to one embodiment, the method may further comprise the following steps of:

- acquisition of operational data and/or environmental data by a sensor device; and
- forwarding the operational data and/or environmental data to the transponder and/or to the data processing device.

Optionally, the method may also include the additional step of performing an action in response to operational and/or environmental data. The action may be, for example, issuing or sending a warning or a message to a user interface, or sending a command, for example to a control system of the passenger transport system.

BRIEF DESCRIPTION OF THE DRAWINGS

Further advantages and features of the invention will be apparent from the following description of preferred embodiments of the subject matter of the invention with reference to the accompanying figures. The following description serves only to clarify the invention and should not be construed as limiting by it the appended claims to any of the embodiments. Showing

DETAILED DESCRIPTION

Figure 1:
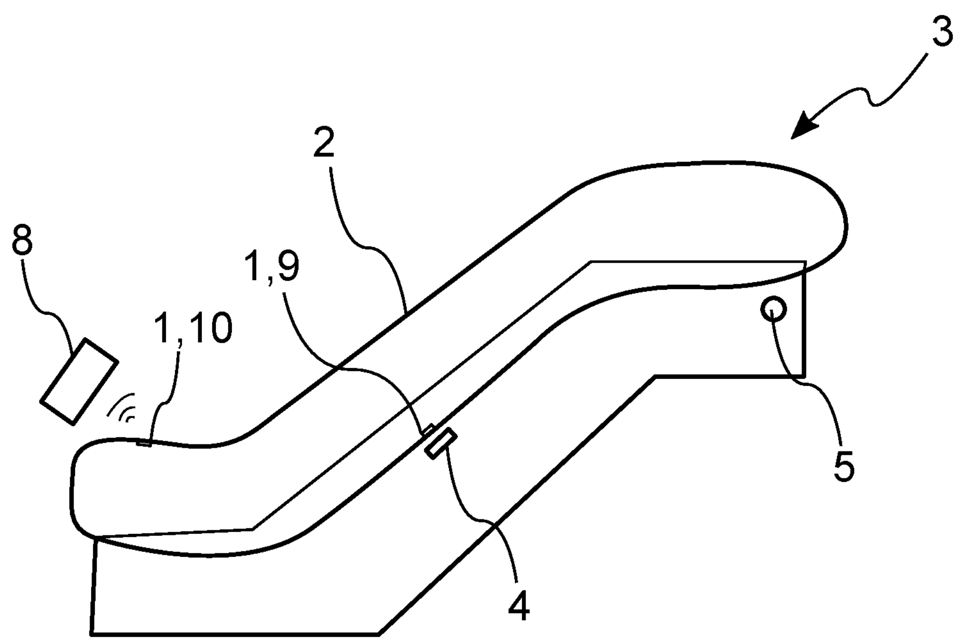
FIG. 1 is a side view of a system according to the invention with a passenger transport system, a handrail and a data processing device.

FIG. 1 shows a side view of a system according to the invention comprising a passenger transport system 3, a handrail 2 and a data processing device 4. In this embodiment, the passenger transport system 3 comprises two transponders 1, namely an RFID tag 9 and an NFC tag 10. The NFC tag 10 is configured to be able to communicate with a mobile data processing device 8. The data processing devices 4, 8 each comprise a reader with which they can read the transponders 1. Furthermore, it is also conceivable that further data processing devices 4 are provided. In particular, several data processing devices 4 may be connected to each other, in particular contactlessly or by cable, or to mobile data processing devices 8. Furthermore, the data processing devices 4, 8 may send data or commands to the transponders 1 by means of a transmitter. The mobile data processing device 8 may be, for example, a smartphone, a tablet, or a purpose-built device. The RFID tag 9 is configured to communicate with a data processing device 4, which in this case is stationary and attached to the passenger transport system. Further, in this example, the system comprises a sensor device 5 configured to be able to communicate with the data processing device 4. Alternatively, the sensor device 5 may be configured to communicate with one of the transponders 1. In particular, it may be provided that the sensor device 5 communicates with one of the transponders 1 when the transponder 1 is in the vicinity of the sensor device 5 due to the circulation of the handrail 2. Alternatively, it is also conceivable that a sensor is integrated directly into one of the transponders 1. For example, the sensor device 5 may be designed to measure an ambient temperature or a speed of the handrail 2.

Figure 2:
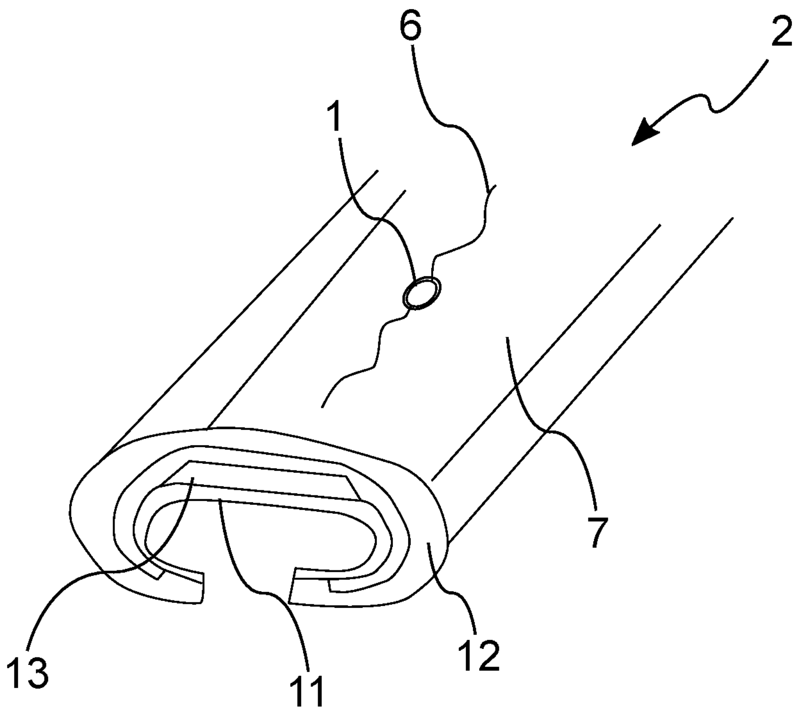
FIG. 2 is a cross-section through a handrail, with an integrated transponder disclosed.
Figure 3:
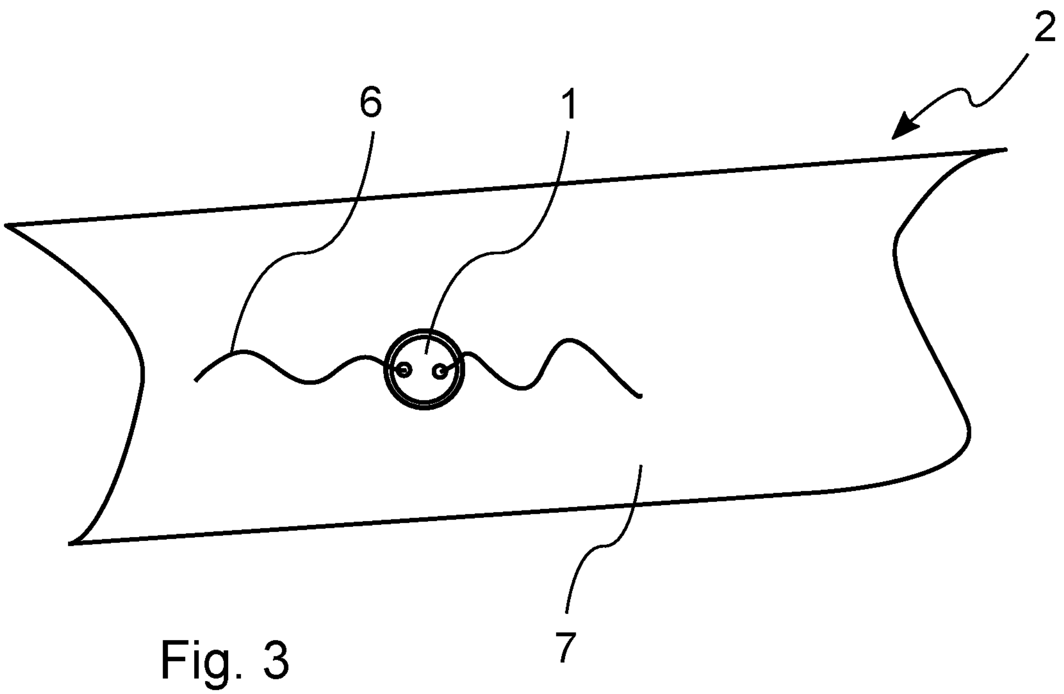
FIG. 3 is a top view of a section of a cut-open handrail.

FIG. 2 shows a cross-section of a handrail 2 wherein an integrated transponder 1 disclosed. A top view of a section of the cut-open handrail 2 is shown in FIG. 3. In this illustration, the base body 12 is removed in the area of the transponder 1 to reveal the transponder 1. The transponder 1 is embedded in a fabric structure 7 of the handrail 2, wherein the fabric structure 7 is located below the base body. In this case, the transponder 1 has a dipole antenna 6 whose arms extend laterally from the transponder and are arranged on the surface of the fabric structure 7. Furthermore, a sliding layer 11 is still shown, which serves to slide with low friction on a guide rail of a passenger transport system 3. A reinforcement part 13, preferably a metal strip or a combination of several metal struts, serves to stabilize the handrail, in particular to prevent bending in the transverse direction.

Figure 4:
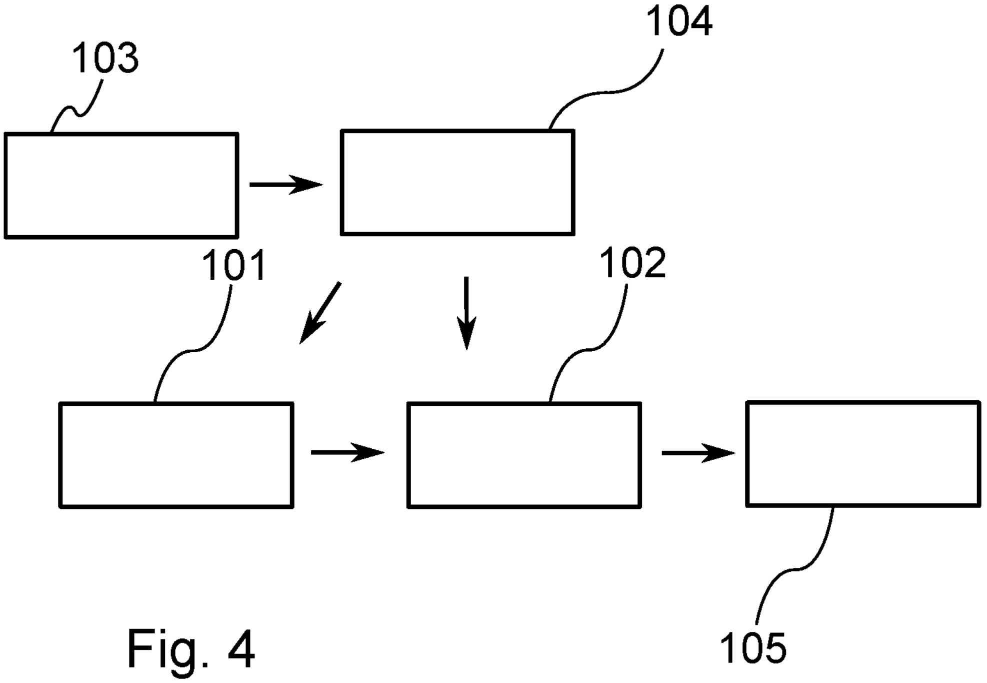
FIG. 4 is a method for monitoring a passenger transport system.

FIG. 4 shows a method for monitoring a passenger transport system 3. Here, step 101 is the contactless transmission of at least one piece of information about the identity of the handrail 2 and/or of operational data and/or of environmental data from the transponder 1 to a data processing device 4 by means of a reader of the data processing device 4. In step 102, the at least one piece of information and/or the operational data is evaluated and/or forwarded by the data processing device 4. In addition, step 103 includes acquiring operational data and/or environmental data by a sensor device 5. This data is forwarded to the transponder 1 and/or to the data processing device 4 in step 104. If the data is forwarded to the transponder 1, it may be forwarded to the data processing device 4 by performing step 101. The optional step 105 consists of performing an action depending on the operational and/or environmental data.

Figure 5:
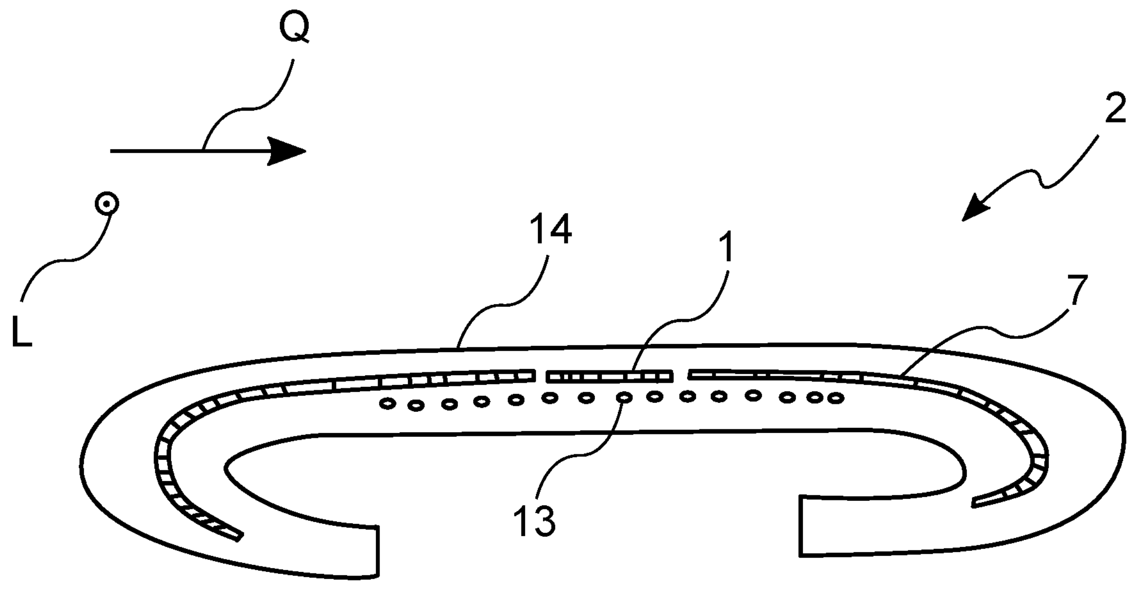
FIG. 5 is a cross-section through a handrail according to a further embodiment of the invention.

FIG. 5 shows a cross-section through a handrail 2 according to a further embodiment of the invention. In this embodiment, the transponder 1 is embedded in a fabric structure 7, which is arranged between the upper side 14 of the handrail 2 and a reinforcement part 13. The line defined by the dotted reinforcement part 13 corresponds essentially to the neutral axis of the handrail 2. For this purpose, the fabric structure has a punched hole in which the transponder is embedded. An extension of the transponder in a transverse direction Q extending transversely to the longitudinal direction L of the handrail is less than the extension of the reinforcement part in this direction.

Figure 6:
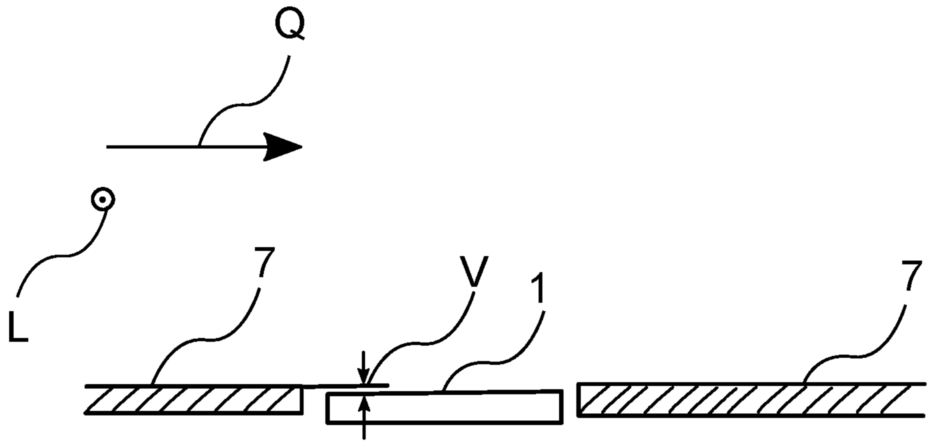
FIG. 6 is a section of the handrail from FIG. 5 around the transponder.

FIG. 6 shows a section of the handrail 2 from FIG. 5 around the transponder 1. Here it can be seen that the transponder 1 has an offset V from the fabric structure 7 towards the top, namely towards the upper side of the handrail 2. This offset V can provide better protection for the transponder 1 and also counteract unraveling of the fabric structure 7 with a layer arranged above the fabric structure.

LIST OF REFERENCE SIGNS

1 Transponder
2 Handrail
3 Passenger transport system
4 Data processing device
5 Sensor device
6 Dipole antenna
7 Fabric structure
8 Mobile data processing device
9 RFID tag
10 NFC tag
11 Sliding layer
12 Base body
13 Reinforcement part
14 Upper side
L Longitudinal direction
Q Transverse direction
V Offset
101-105 Procedural steps

The invention claimed is:

1. A handrail for a passenger transport system, such as an escalator or a moving walkway, comprising:
- at least one transponder containing at least one piece of information integrally arranged on a surface or inside the handrail;
- wherein the transponder is configured such that the at least one piece of information can be transmitted contactlessly from the transponder to a reader;
- wherein the handrail comprises several layers;
- wherein one of the layers is an inner layer that comprises a textile; and
- wherein the transponder is embedded in the textile where the textile is arranged between an upper side of the handrail and a reinforcement part.

2. The handrail according to claim 1, wherein the transponder includes an RFID tag or an NFC tag, and/or wherein the transponder includes a printed circuit board or PCB.

3. The handrail according to claim 1, wherein the at least one piece of information is configured to identify the transponder and/or the handrail.

4. The handrail according to claim 1, wherein the transponder is arranged such that a side of the transponder directed towards an outer side of the handrail is spaced further or by the same distance from the outer side than a side of the inner layer in which the transponder is embedded, directed towards the outer side upper side of the handrail.

5. The handrail according to claim 4, wherein the outside side of the handrail includes an upper side of the handrail.

6. The handrail according to claim 1, wherein the transponder comprises a data memory or is connected to a data memory;
- wherein the transponder is configured to receive data and/or commands and to store the data and/or the commands on the data memory; and
- wherein the transponder is configured to transmit the data contactless from the transponder to the reader.

7. The handrail according to claim 6, wherein the transponder comprises a processing unit or is connected to a processing unit that is adapted to process the received data, and wherein the transponder is configured to allow processed data to be transmitted contactlessly from the transponder to the reader.

8. The handrail according to claim 1, wherein the handrail comprises at least one sensor and/or at least one transducer with evaluation unit, and wherein the sensor and/or the transducer is integrated in the transponder or is connected to the transponder.

9. The handrail according to claim 8, wherein the transducer is analog or digital.

10. The handrail according to claim 1, wherein the transponder has a section of signal-optimizing and/or attenuating material, and wherein the section is arranged adjacent to the transponder and/or is attached to the transponder.

11. A system for monitoring a passenger transport system, comprising:

the handrail according to claim 1;

wherein the passenger transport system includes an escalator or a moving walkway that includes the handrail; and a data processing device comprising the reader, wherein the data processing device is configured to read the at least one piece of information of the transponder and/or data stored on the transponder via the reader in a contactless manner and to evaluate and/or forward the at least one piece of information.

12. The system according to claim 11, wherein the system further comprises:

at least one sensor device configured to detect operational data and/or environmental data, and to forward the data to the transponder and/or the data processing device, and wherein the data processing device is configured to receive and process and/or forward the data from the sensor device.

13. The system according to claim 11, wherein a handrail database is stored on the data processing device or the data processing device is configured to establish a connection to a handrail database, wherein the at least one piece of information includes information about the identity of the handrail, and wherein the data processing device is configured to detect whether the handrail is an original handrail by matching the at least one piece of information about the identity of the handrail with the database.

14. The system according to claim 13, wherein the data processing device is configured to perform or initiate an output of a message and/or a command to prevent the operation of the passenger transport system upon detection of a non-original handrail.

15. A method for monitoring a passenger transport system, comprising:

providing the handrail according to claim 1;

contactlessly transmitting the at least one piece of information about the identity of the handrail and/or operational data and/or environmental data from the transponder to a data processing device via the reader; and evaluating and/or forwarding the at least one piece of information and/or the operational data by the data processing device.

16. The method according to claim 15, further comprising:

acquiring the operational data and/or environmental data by a sensor device; and forwarding the operational data and/or environmental data to the trans-ponder and/or to the data processing device.

* * * * *